United States Patent
Sultenfuss et al.

(10) Patent No.: US 10,680,467 B2
(45) Date of Patent: Jun. 9, 2020

(54) ADAPTIVE POWER MANAGEMENT FOR NON-CHIRAL AUXILIARY WIRELESS POWER MODULES

(71) Applicant: Dell Products L.P., Round Rock, TX (US)

(72) Inventors: Andrew Thomas Sultenfuss, Leander, TX (US); Mark David Menendez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 16/177,699

(22) Filed: Nov. 1, 2018

(65) Prior Publication Data
US 2020/0144867 A1    May 7, 2020

(51) Int. Cl.
| | | |
|---|---|---|
| H02J 50/40 | (2016.01) | |
| H02J 7/02 | (2016.01) | |
| H02J 50/70 | (2016.01) | |
| H02J 50/10 | (2016.01) | |

(52) U.S. Cl.
CPC ............. H02J 50/40 (2016.02); H02J 7/025 (2013.01); H02J 50/10 (2016.02); H02J 50/70 (2016.02)

(58) Field of Classification Search
CPC .. H02J 50/40; H02J 50/10; H02J 50/70; H02J 7/025; H02J 7/02
See application file for complete search history.

(56) References Cited

PUBLICATIONS

Universal Serial Bus, "USB Power Delivery." Retrieved from <http://www.usb.org/developers/powerdelivery/> on Jun. 28, 2017; 3 pages, Jun. 28, 2017.
UEFI, "Unified Extensible Firmware Interface (UEFI) Specification", Retrieved from <http://uefi.org> May 2017; 2899 pages, Jun. 28, 2017.

*Primary Examiner* — Robert L Deberadinis
(74) *Attorney, Agent, or Firm* — Baker Botts L.L.P.

(57) ABSTRACT

Techniques for adaptive power management for non-chiral auxiliary wireless power modules include receiving, by a wireless charging mat, DC input power, determining, dependent on the DC input power, a budget for inductive power available for charging portable devices placed on the wireless charging mat, detecting, at a first port, a connection by a first auxiliary wireless charging mat, determining an amount of power to be provided to the first auxiliary wireless charging mat, determining, dependent on the amount of power to be provided to the first auxiliary wireless charging mat, a reduced budget for the inductive power available for charging portable devices, and providing the determined amount of power to the first auxiliary wireless charging mat. In response to detecting a connection by a second auxiliary charging mat or a portable device at a second port located opposite the first port, the inductive power budget may be further modified.

20 Claims, 8 Drawing Sheets

US 10,680,467 B2

ADAPTIVE POWER MANAGEMENT FOR NON-CHIRAL AUXILIARY WIRELESS POWER MODULES

BACKGROUND

Field of the Disclosure

This disclosure relates generally to information handling systems and, more particularly, to adaptive power management for auxiliary wireless power modules.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device. The rechargeable battery is typically charged using DC power adapter.

SUMMARY

In one aspect, a disclosed host wireless charging mat for an information handling system includes a first port, a direct current (DC) power interface configured to receive DC input power, a transmitting coil configured to generate an oscillating magnetic field, a power conversion unit electrically coupled to the DC power interface that, in conjunction with the transmitting coil, is configured to transmit inductive power, and an embedded power controller. The embedded power controller is configured to determine, dependent on the received DC input power, an initial budget for inductive power available for portable devices placed on the host wireless charging mat, detect, at the first port, a connection by a first auxiliary wireless charging mat, determine an amount of power to be provided to the first auxiliary wireless charging mat, determine, dependent on the amount of power to be provided to the first auxiliary wireless charging mat, a reduced budget for the inductive power available for portable devices placed on the host wireless charging mat, and cause the determined amount of power to be supplied to the first auxiliary wireless charging mat.

In any of the disclosed embodiments, the embedded power controller may be further configured to detect, at a second port on the host wireless charging mat, a connection by a second auxiliary wireless charging mat, to determine an amount of power to be provided to the second auxiliary wireless charging mat by the host wireless charging mat, to determine, dependent on the amount of power to be provided to the second auxiliary wireless charging mat by the host wireless charging mat, a further reduced budget for the inductive power available for portable devices placed on the host wireless charging mat, and to cause the determined amount of power to be supplied to the second auxiliary wireless charging mat.

In any of the disclosed embodiments, the embedded power controller may be further configured to detect, at a second port on the host wireless charging mat, a connection by a portable device, to determine an amount of power to be provided to the portable device by the host wireless charging mat, to determine, dependent on the amount of power to be provided to the portable device by the host wireless charging mat, a further reduced budget for the inductive power available for portable devices placed on the host wireless charging mat, and to cause the determined amount of power to be supplied to the portable device.

In any of the disclosed embodiments, the embedded power controller may be further configured to determine that the portable device is compatible with a wireless power transfer standard implemented by the host wireless charging mat. Determining the amount of power to be provided to the portable device may include receiving, from the portable device, an indication of a requested amount of power.

In any of the disclosed embodiments, the embedded power controller may be further configured to determine that the first auxiliary wireless charging mat is compatible with a wireless power transfer standard implemented by the host wireless charging mat. Determining the amount of power to be provided to the first auxiliary wireless charging mat may include receiving, from the first auxiliary wireless charging mat, an indication of a requested amount of power.

In any of the disclosed embodiments, the embedded power controller may be further configured to detect that the first auxiliary wireless charging mat is no longer connected to the first port on the host wireless charging mat, and to determine, dependent on detecting that the first auxiliary wireless charging mat is no longer connected to the first port on the host wireless charging mat, an increased budget for the inductive power available for portable devices placed on the host wireless charging mat.

In any of the disclosed embodiments, the embedded power controller may be further configured to detect that a portable device has been placed on the host wireless charging mat, and to cause an amount of inductive power less than or equal to the initial budget for the inductive power available for portable devices placed on the host wireless charging mat to be supplied to the portable device.

In any of the disclosed embodiments, the embedded power controller may be further configured to monitor power consumption by the first auxiliary wireless charging mat, and to determine, in response to detecting a change in power consumption by the first auxiliary wireless charging mat, a modified budget for the inductive power available for portable devices placed on the host wireless charging mat.

In any of the disclosed embodiments, the host wireless charging mat may further include a second port located at a side of the host wireless charging mat other than a side at which the first port is located, the first and second ports being configured for non-cabled connections to the host wireless charging mat, and a respective vent mechanism located on the side of the host wireless charging mat at which the first port is located and on the side of the host wireless charging mat at which the second port is located.

In another aspect, a disclosed method is for adaptive power management. The method includes receiving, by a host wireless charging mat configured to provide power to portable devices, direct current (DC) input power, determining, dependent on the received DC input power, an initial budget for inductive power available for portable devices placed on the host wireless charging mat, detecting, at a first port on the host wireless charging mat, a connection by a first auxiliary wireless charging mat, determining an amount of power to be provided to the first auxiliary wireless charging mat by the host wireless charging mat, determining, dependent on the amount of power to be provided to the first auxiliary wireless charging mat by the host wireless charging mat, a reduced budget for the inductive power available for portable devices placed on the host wireless charging mat, and providing the determined amount of power to the first auxiliary wireless charging mat.

In any of the disclosed embodiments, the method may further include detecting, at a second port on the host wireless charging mat, a connection by a second auxiliary wireless charging mat, determining an amount of power to be provided to the second auxiliary wireless charging mat by the host wireless charging mat, determining, dependent on the amount of power to be provided to the second auxiliary wireless charging mat by the host wireless charging mat, a further reduced budget for the inductive power available for portable devices placed on the host wireless charging mat, and providing the determined amount of power to the second auxiliary wireless charging mat.

In any of the disclosed embodiments, the method may further include detecting, at a second port on the host wireless charging mat, a connection by a portable device, determining an amount of power to be provided to the portable device by the host wireless charging mat, determining, dependent on the amount of power to be provided to the portable device by the host wireless charging mat, a further reduced budget for the inductive power available for portable devices placed on the host wireless charging mat, and providing the determined amount of power to the portable device.

In any of the disclosed embodiments, the method may further include determining that the first auxiliary wireless charging mat is compatible with a wireless power transfer standard implemented by the host wireless charging mat. Determining the amount of power to be provided to the first auxiliary wireless charging mat may include receiving, from the first auxiliary wireless charging mat, an indication of a requested amount of power.

In any of the disclosed embodiments, the method may further include detecting that a portable device has been placed on the host wireless charging mat, and providing, to the portable device, an amount of inductive power less than or equal to the initial budget for the inductive power available for portable devices placed on the host wireless charging mat.

In any of the disclosed embodiments, the method may further include monitoring power consumption by the first auxiliary wireless charging mat, and determining, in response to detecting a change in power consumption by the first auxiliary wireless charging mat, a modified budget for the inductive power available for portable devices placed on the host wireless charging mat.

In yet another aspect, a disclosed non-transitory computer readable memory media stores instructions executable by a processor for determining, dependent on direct current (DC) input power received by a host wireless charging mat, an initial budget for inductive power available for portable devices placed on the host wireless charging mat, for detecting a connection by a first auxiliary wireless charging mat at a first port on the host wireless charging mat, for determining an amount of power to be provided to the first auxiliary wireless charging mat by the host wireless charging mat, for determining, dependent on the amount of power to be provided to the first auxiliary wireless charging mat, a reduced budget for the inductive power available for portable devices placed on the host wireless charging mat, and for causing the determined amount of power to be supplied to the first auxiliary wireless charging mat.

In any of the disclosed embodiments, the instructions may be further executable by the processor for detecting, at a second port on the host wireless charging mat, a connection by a second auxiliary wireless charging mat, for determining an amount of power to be provided to the second auxiliary wireless charging mat by the host wireless charging mat, for determining, dependent on the amount of power to be provided to the second auxiliary wireless charging mat by the host wireless charging mat, a further reduced budget for the inductive power available for portable devices placed on the host wireless charging mat, and for causing the determined amount of power to be supplied to the second auxiliary wireless charging mat.

In any of the disclosed embodiments, the instructions may be further executable by the processor for detecting, at a second port on the host wireless charging mat, a connection by a portable device, for determining an amount of power to be provided to the portable device by the host wireless charging mat, for determining, dependent on the amount of power to be provided to the portable device by the host wireless charging mat, a further reduced budget for the inductive power available for portable devices placed on the host wireless charging mat, and for causing the determined amount of power to be supplied to the portable device.

In any of the disclosed embodiments, the instructions may be further executable by the processor for determining that the first auxiliary wireless charging mat is compatible with a wireless power transfer standard implemented by the host wireless charging mat. Determining the amount of power to be provided to the first auxiliary wireless charging mat may include receiving, from the first auxiliary wireless charging mat, an indication of a requested amount of power.

In any of the disclosed embodiments, the instructions may be further executable by the processor for detecting that a portable device has been placed on the host wireless charging mat, and for causing an amount of inductive power less than or equal to the initial budget for the inductive power available for portable devices placed on the host wireless charging mat to be supplied to the portable device.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF PARTICULAR EMBODIMENT(S)

Figure 1:
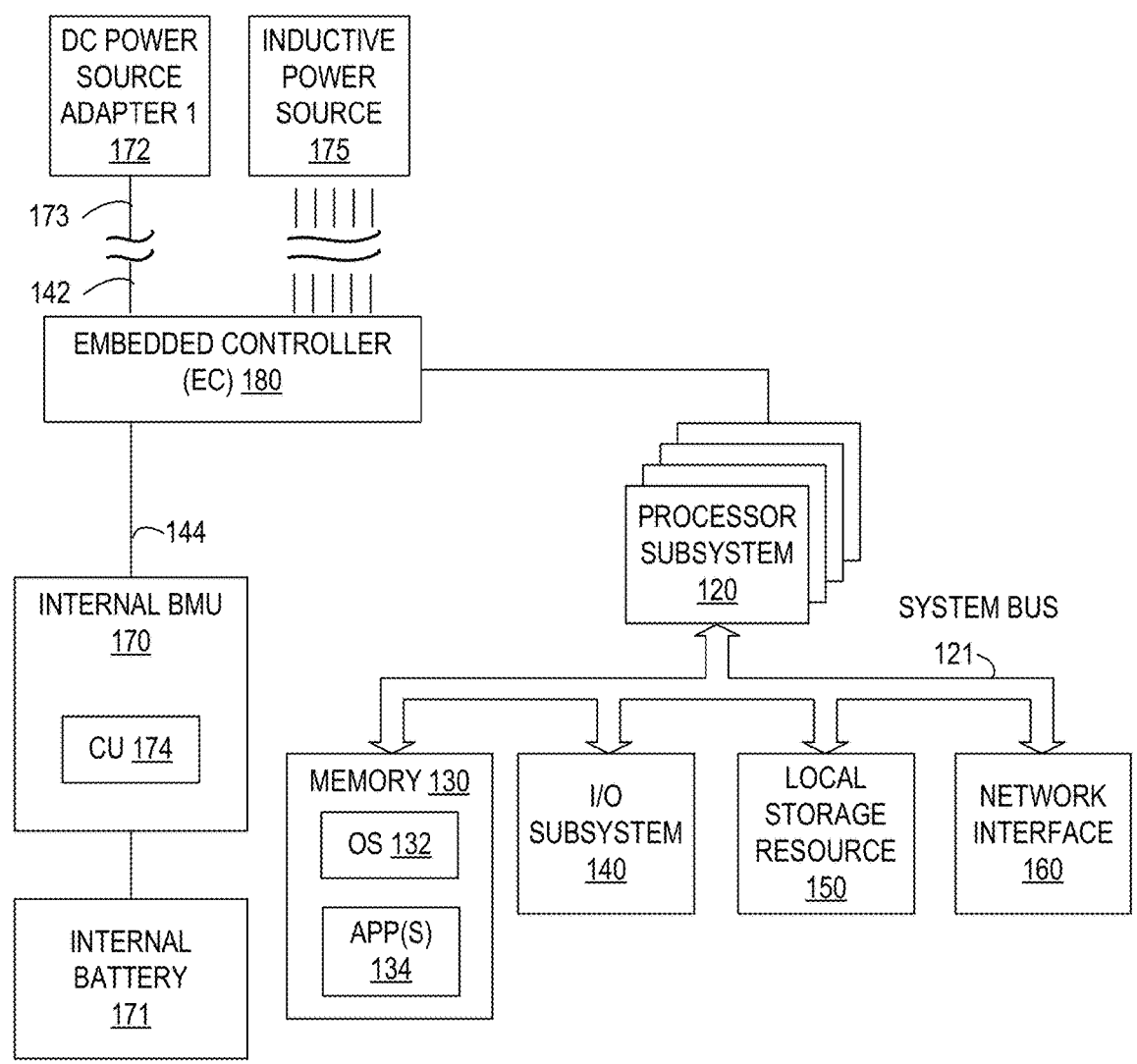
FIG. 1 is a block diagram illustrating selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Portable information handling systems exhibit a wide variety of configurations available from multiple vendors and may include any of a wide variety of accessories. These accessories often include a DC power adapter for supplying electrical power from a power source to the information handling system for operation and/or for charging an internal battery of the information handling system. DC power source adapters of different types may have different physical attributes (e.g., different sizes, shapes, or connector types), different electrical characteristics (e.g., different voltage profiles), or different power delivery capabilities and may adhere to different power delivery protocols. In some cases, portable information handling systems include multiple power ports, some of which may be configured to receive electrical power from DC power source adapters of different types.

In some cases, a portable information handling system may be configured to receive inductive power transferred to the portable information handling system by a wireless power module, such as a wireless charging mat. For example, in some embodiments, a portable information handling system and a wireless charging mat may be configured in accordance with a wireless power transfer standard, such as the Qi open interface standard developed by the Wireless Power Consortium, which defines wireless power transfer using inductive charging over distances of up to 4 cm (1.6 inches). In accordance with this standard, an information handling system may include charging mat and a corresponding portable device, which is placed on top of the charging mat. When DC input power is supplied to the charging mat, an internal battery in the portable device is charged via resonant inductive coupling. Under the low-power Qi specification, a wireless power module may deliver up to 5 W (e.g., to charge and/or power mobile devices), while under the medium-power Qi specification, a wireless power module may deliver up to 120 W (e.g., to charge and/or power larger devices, such as displays and laptop computers).

As described in more detail herein, a host wireless charging mat may include multiple ports configured for USB-C type connections to support the addition of auxiliary wireless charging mats in a left- or right-handed configuration as well as an inverted (rotated) configuration. An embedded power controller may track the connection of auxiliary wireless charging mats or other devices to the host wireless charging mat, as well as unused power levels, and adaptively budget inductive power to be provided to devices placed on the host wireless charging mat based on the amount of power allocated to the connected devices. In some embodiments, the air flow operation of the host wireless charging mat may be addressed via venting relief on multiple sides of the wireless charging mat allowing operation of an auxiliary wireless charging mat on or near particular vents.

Particular embodiments are best understood by reference to FIGS. 1-6E wherein like numbers are used to indicate like and corresponding parts.

Turning now to the drawings, FIG. 1 illustrates a block diagram depicting selected elements of an embodiment of portable information handling system 100. It is noted that FIG. 1 is not drawn to scale but is a schematic illustration. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

Figure 2:
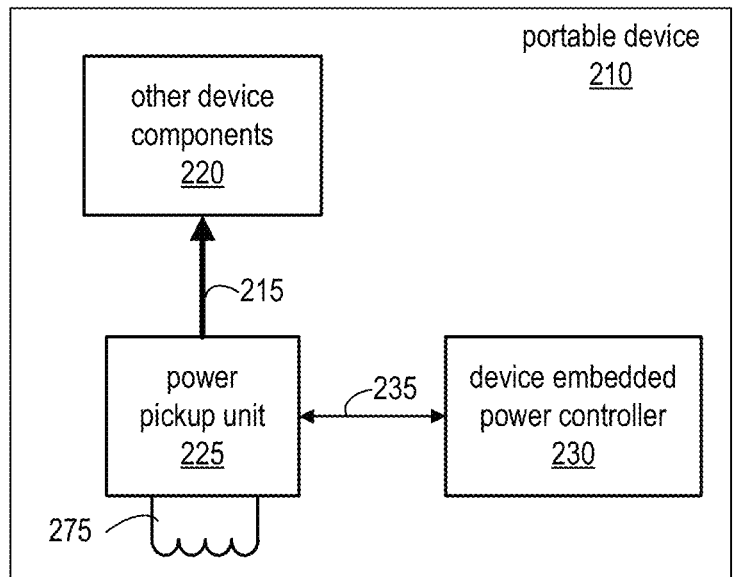
FIG. 2 is a block diagram illustrating selected elements of an embodiment of a system including a portable device and a wireless power module.
Figure 2:
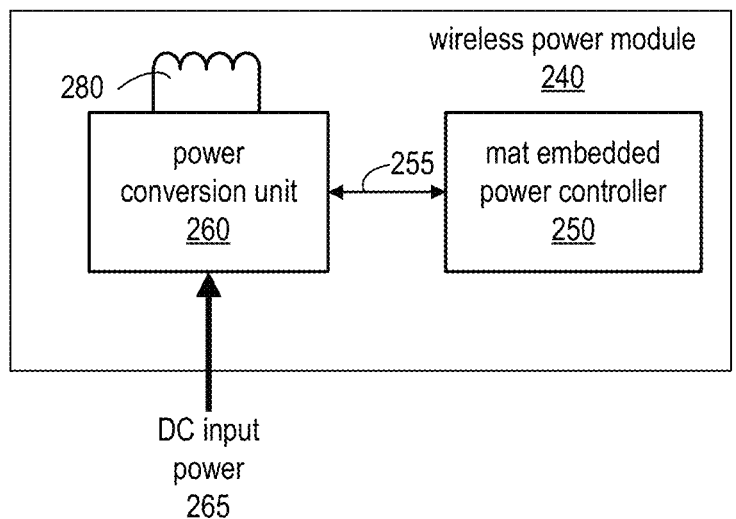
Figure 4:
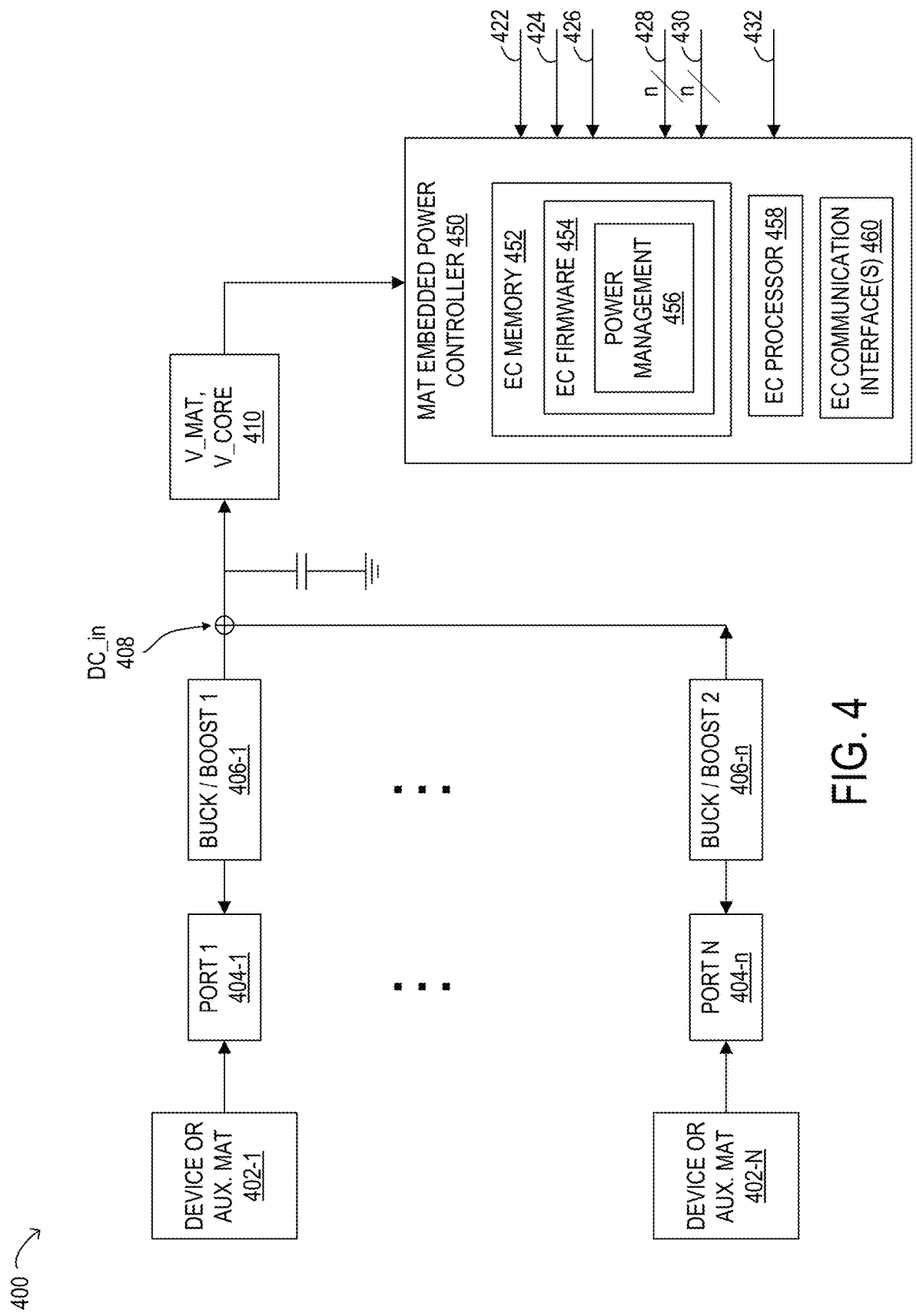
FIG. 4 is a block diagram illustrating selected elements of an embodiment of a power management circuit for managing power in a wireless power module of an information handling system.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, and a network interface 160. Also shown within information handling system 100 is embedded controller 180 and an internal battery management unit (BMU) 170 that manages an internal battery 171. Information handling system 100 is shown removably coupled to a DC power input 173 that may supply electrical power for operation of information handling system 100, including for charging internal battery 171, received from a DC power source through a direct current (DC) power source adapter 172. Furthermore, information handling system 100 is shown removably coupled to an inductive power source 175, such as a wireless charging mat or another type of wireless power module, that may supply inductive power for operation of information handling system 100, including for charging internal battery 171. Example embodiments of wireless power modules are illustrated in FIGS. 2 and 4 and described in detail below.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource accessed through network interface 160).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for portable information handling system 100, and one or more applications 134. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating.

In particular embodiments, embedded controller 180 may support one or more power busses 142 that carry and distribute electrical power to and from portable information handling system 100. In some embodiments, a power bus 142 may represent a data bus that also carries and distributes electrical power to and from portable information handling system 100. For example, a DC power input 173 received from an external power source through a respective DC power source adapter 172 may be routed via a DC power connection 144 to internal BMU 170-1 for purposes of charging internal battery 171 or otherwise powering portable information handling system 100.

In various embodiments, a power bus 142 may represent a variable power bus that supports different levels of direct current (DC) power that may be provided to certain peripherals connected to I/O subsystem 140. In certain embodiments, a variable power bus 142 may be implemented according to an industry standard, such as a USB Universal Serial Bus (USB), which is developed and supported by the USB Implementers Forum, Inc. (USB IF, www.usb.org). In particular, a variable power bus 142 may be implemented as a USB Type-C bus that may support different USB devices, such as USB Type-C devices with USB Type-C connectors. Accordingly, a variable power bus 142 may support device detection, interface configuration, communication, and power delivery mechanisms according to the USB Type-C standard. The USB Type-C connector system allows the transport of data and electrical power (in the form of DC power) between various USB devices that are connected using USB Type-C ports and USB Type-C connectors. A USB device may be an information handling system, a peripheral device, or a power device, among other types of USB devices, and may support more than one USB standard or generation, such as USB 1.0, USB 2.0, USB 3.0, USB 3.1, or other versions. Furthermore, USB devices may also support one or more types of physical USB ports and corresponding connectors (i.e., receptacles and plugs), such as Type-A, Type-A SuperSpeed, Type-B, Type-B SuperSpeed, Mini-A, Mini-B, Micro-A, Micro-B, Micro-B SuperSpeed, and Type-C (also referred to as USB Type-C herein), among other variants. In one example, USB 3.1 Type-C cables may provide electronic functionality using an integrated semiconductor device with an identification function based on a configuration data channel and vendor-defined messages (VDMs) from a USB Power Delivery specification published by USB IF (http://www.usb.org/developers/powerdelivery/). Examples of source power rules governed by the USB Power Delivery Specification, revision 2.0, version 1.2 are given in Table 1 below.

TABLE 1

USB Power Delivery revision 2.0, version 1.2 source power rules.

| Source Output Power [W] | Current [A] at +5 V DC | Current [A] at +9 V DC | Current [A] at +15 V DC | Current [A] at +20 V DC |
| --- | --- | --- | --- | --- |
| 0.5 to 15 | 0.1 to 3.0 | none | none | none |
| 15 to 27 | 3.0 (15 W limit) | 1.7 to 3.0 | none | none |
| 27 to 45 | 3.0 (15 W limit) | 3.0 (27 W limit) | 1.8 to 3.0 | none |
| 45 to 60 | 3.0 (15 W limit) | 3.0 (27 W limit) | 3.0 (45 W limit) | 2.25 to 3.0 |
| 60 to 100 | 3.0 (15 W limit) | 3.0 (27 W limit) | 3.0 (45 W limit) | 3.0 to 5.0 |

As shown in Table 1, USB Power Delivery defines four standardized voltage levels (+5V DC, +9V DC, +15V DC, and +20V DC), while power supplies may provide electrical power from 0.5 watts to 100 watts.

A USB device, such as a USB Type-C device, may provide multiple power ports that can individually transfer power in either direction and may accordingly be able to operate as a power source device, a power sink device, or both (dual-role power device). A USB device operating as a dual-role power device may operate as a power source or a power sink depending on what kinds of other USB devices are connected. In addition, each of the multiple power ports provided by the USB device may be a dual-role power port that is able to operate as either a power source port or a power sink port. For example, a USB Type-C bus, such as variable power bus 142, may support power delivery from a power source port of a power source USB device to a power sink port of a power sink USB device, while simultaneously supporting bidirectional USB data transport. The power source port of the power source USB device and the power sink port of the power sink USB device form a power port pair. Each of the other power ports provided by the USB device may form other power port pairs of other USB dual-role power devices.

According to the USB Power Delivery Specification, USB Type-C devices may perform a negotiation process to negotiate and establish a power contract for a particular power port pair that specifies a level of DC power that is transferred using USB. For example, a USB Type-C device may negotiate a power contract with another USB device for a level of DC power that is supported by a power port pair of both devices, where one power port is a power source port of the USB Type-C device and the other power port is a power sink port of the other USB device. The power contract for power delivery and consumption may represent an agreement reached between the power source device and the power sink device for the power port pair. While operating in Power Delivery mode, the power contract for the power port pair will generally remain in effect unless altered by a re-negotiation process, a USB soft reset, a USB hard reset, a removal of power by a power source, a failure of the power source, or a USB role swap (such as between power source and power sink devices), as specified in detail by USB IF. When a particular power contract is in place, additional power contracts can be established between another power port of the power source device and a power port of another power sink device.

According to the USB Power Delivery specification, the negotiation process may begin with the power source device detecting an attachment of a USB device operating as a power sink to a power port of the power source device. In response to the detection of the attachment at the respective USB ports, the power source device may communicate a set of supported capabilities including power levels, voltage levels, current levels, and direction of power flow of the power port of the power source device by sending the set of supported capabilities to the power sink over the USB connection. In response to receiving the set of supported capabilities, the power sink device may request one of the communicated capabilities by sending a request message to the power source device. In response to receiving the request message, the power source device may accept the request by sending an accept message and by establishing a power source output corresponding to the request. The power contract for the power port pair may be considered established and in effect when the power source device sends the accept message to the power sink device, which ends the negotiation process. A re-negotiation process may occur in a similar manner when a power contract is already in effect.

During the negotiation process, a power sink USB device that may be unable to fully operate at any of the communicated capabilities may request a default capability but indicate that the power sink USB device would prefer another power level. In response to receiving the default capability request, the power source device may accept the default capability request by storing the power sink USB device's preferred power level, sending an accept message, and by establishing a power source output corresponding to the default capability request.

During the various negotiation processes described above for USB Power Delivery, the negotiation may fail when a request is not accepted, and may result in no power contract being established. For example, the power sink USB device and the power source USB device may have timeouts for pending requests, or other communications, to a respective counterparty. When a counterparty does not respond within the timeout, a pending request or other communication may fail. It is also noted that in some embodiments, a power delivery contract for zero electrical power may be established, such that no power is transferred but the power port pair remains connected over the USB connection.

In certain embodiments, a power bus 142 may receive a DC power input 173 through a connector other than a USB type connector. For example, one or more of DC power source adapters 172 may include a barrel-type connector, a Lightning™ connector developed by Apple, Inc., or a Thunderbolt™ connector developed by Apple, Inc., among other connector types. In some embodiments, one or more external power sources may be electrically coupled to an information handling system using means other than a DC power source adapter and the electrical power they supply may be combined with other externally supplied electrical power in a manner similar to that described herein for combining electrical power supplied by multiple connected DC power source adapters. For example, in some embodiments, the techniques described herein may be applied to combine electrical power supplied by an external battery or other type of external power source (e.g., a wireless charging solution, a solar power solution, etc.) with electrical power supplied by other such power sources or by one or more DC power source adapters.

Also shown in FIG. 1 is embedded controller (EC) 180, which may include an EC processor as a second processor included within portable information handling system 100 for certain management tasks, including supporting communication and providing various functionality with respect to internal BMU 170. Thus, the EC processor may have access to an EC memory, which may store EC firmware representing instructions executable by the EC processor. In some embodiments, the EC firmware includes a power management function, which may represent executable code for managing DC power sources, as well as for controlling various operating parameters of internal battery 170.

In some embodiments, the EC firmware may include pre-boot instructions executable by the EC processor. For example, the EC firmware may be operable to prepare information handling system 100 to boot by activating various hardware components in preparation of launching an operating system for execution. Accordingly, in some embodiments, EC firmware may include a basic input/output system (BIOS). In certain embodiments, EC firmware includes a Unified Extensible Firmware Interface (UEFI) according to a specification promulgated by the UEFI Forum (uefi.org). Embedded controller 180 may execute EC firmware on the EC processor even when other components in information handling system 100 are inoperable or are powered down. Furthermore, EC firmware may be in control of EC communication interface(s), which may represent one or more input/output interfaces or signals that embedded controller 180 can use to communicate with other elements of information handling system 100, such as processor subsystem 120 or I/O subsystem 140, among others.

In some embodiments, embedded controller 180 may be responsible for managing electrical power connections between internal or external power sources and other portions of portable information handling system 100. In other embodiments, power control may be implemented by a separate power controller external to embedded controller 180. For example, a power bus 142 may supply electrical power to portable information handling system 100, in which case embedded controller 180, or a separate power controller, may determine whether the electrical power is used to charge internal battery 171 or to directly power portable information handling system 100. In another example, embedded controller 180, or a separate power controller, may manage so-called 'soft start up' of portable information handling system 100, such as when portable information handling system 100 awakes from a low power state, such as sleep mode, by determining a source of power during the low power state and managing operation of portable information handling system 100 during the low power state. In the illustrated embodiment, DC power and control 144 may represent suitable connections between embedded controller 180 and internal BMU 170, for example. This may include connections for providing data obtained from internal battery 171 (e.g., temperature, battery state, state of charge, etc.), which may serve as inputs for power management within information handling system 100.

As illustrated in FIG. 1, portable information handling system 100 may include a battery management unit (BMU) 170 that controls operation of internal battery 171. In particular implementations, BMU 170 may be embedded within a respective battery whose operation BMU 170 controls. For example, internal BMU 170 within portable information handling system 100 may control operation of an internal battery 171. More specifically, BMU 170 may monitor information associated with, and control charging operations of, internal battery 171. In operation, BMU 170 may control operation of internal battery 171 to enable sustained operation, such as by protecting internal battery 171. Protection of internal battery 171 by BMU 170 may comprise preventing internal battery 171 from operating outside of safe operating conditions, which may be defined in terms of certain allowable voltage and current ranges over which internal battery 171 can be expected to operate without causing self-damage. For example, the BMU 170 may modify various parameters in order to prevent an over-current condition (whether in a charging or discharging mode), an over-voltage condition during charging, an under-voltage condition while discharging, or an over-temperature condition, among other potentially damaging conditions.

As used herein, "top-of-charge voltage" (or "TOC" voltage) refers to a voltage threshold used during a charge cycle of a battery to determine a 100% charge level. It is noted that the top-of-charge voltage set on a given battery may be lower than a "maximum charge voltage", which may specify a maximum voltage that a given battery having a given battery chemistry can safely endure during charging without damage. As used herein, the terms "state of charge", "SOC", or "charge level" refer to an actual charge level of a battery, from 0% to 100%, for example, based on the currently applied top-of-charge voltage. The SOC may be correlated to an actual voltage level of the battery, for example, depending on a particular battery chemistry.

In some embodiments, internal battery 171 illustrated in FIG. 1 may be considered to be discharged when an SOC of the battery corresponds to an SOC that is below a predetermined threshold percentage or amount below the 100% charge level given by the TOC voltage, such as below a 5% charge level in one example. Internal battery 171 may be considered to be charged, i.e., at least partially charged, when the SOC for the battery corresponds to an SOC that is above a first predetermined threshold percentage or amount below the 100% charge level given by the TOC voltage, such as above the 25% charge level in one example. Internal battery 171 may be considered to be fully charged when the SOC of the battery corresponds to an SOC that is above a second predetermined threshold percentage or amount below the 100% charge level given by the TOC voltage, such as above the 95% charge level for example. Internal battery 171 may be considered to be at least partially discharged when the SOC of the battery corresponds to an SOC that is below the 100% charge level. The parameters for specifying an SOC described above are examples and may be modified using different values in different embodiments.

In various embodiments, internal battery 171 illustrated in FIG. 1 may include one or more cells having a particular chemistry in a particular cell configuration. For example, in one embodiment, internal battery 171 may include four Lithium-ion cells in a two parallel-two serial (2S-2P) configuration. In other embodiments, internal battery 171 may include a different number of cells or may include multiple cells in a different configuration. For example, internal battery 171 may include three or more cells in various configurations. In some embodiments, internal battery 171 may include one or more cells based on any one of a variety of Lithium-ion electrochemistries, or one or more cells based a different electrochemistry than Lithium-ion.

As shown in FIG. 1, a DC power source adapter 172 may be designed to removably couple to portable information handling system 100 using a power bus 142. For example, a power bus 142 may include power connections for electrically coupling a DC power source adapter 172 to portable information handling system 100 as an external load on DC power source adapter 172. In certain embodiments, a power bus 142 may be a variable power bus that also includes a communication link to enable a DC power source adapter 172 to communicate with portable information handling system 100. For example, a DC power source adapter 172 may communicate power delivery capabilities of the DC power source adapter 172 to portable information handling system 100 over a communication link within a variable power bus 142. In other embodiments, there may be a communication link between a DC power source adapter 172 and portable information handling system 100 that is separate from any of the power busses 142 instead of, or in addition to, a communication link that is part of a variable power bus 142. In some embodiments, a communication link between DC power source adapter 172 and portable information handling system 100 may operate in accordance with a System Management Bus (SMBus) protocol for sending and receiving data. As noted above, in particular embodiments, a variable power bus 142 may be compatible with USB Type-C and may be implemented according to USB Type-C and USB Power Delivery specifications promulgated by USB IF.

In various embodiments, internal battery 171 may include at least certain portions of a main power circuit across positive and negative terminals, a current sensor, a voltage sensor, one or more battery cells, a fuse, and a power switch (not shown). The current sensor may represent a shunt resistor, or other current sensing element, over which a voltage that is directly proportional to the current flowing through the main power circuit is measured. The battery cells may store and output electrical energy based on a given electrochemical composition internal to the battery cells. The voltage sensor may enable voltage measurement of individual battery cells, or measurement of an aggregate voltage for the battery including all battery cells operating together. One or more temperature sensors may be located in proximity to the battery cells to provide accurate indications of the temperature at different locations within battery 171. The fuse may be a safety element for limiting current flowing through the main power circuit. The power switch may be an electronically controlled switching element that closes or opens the main power circuit, and thereby allows the battery to operate for charging or discharging.

In FIG. 1, BMU 170 may include a charging unit (CU) 174 that may control charging cycles for internal battery 171 and may apply a TOC voltage as a threshold to determine when charging is complete as the battery voltage increases during charging. The TOC voltage may be lower than or equal to the maximum charge voltage that internal battery 171 can physically sustain, in different embodiments. Depending on the actual value for the TOC voltage, a given energy capacity may be stored using internal battery 171. BMU 170 may also be enabled to obtain various types of information associated with internal battery 171 and to make decisions according to the obtained information. For example, BMU 170 may monitor various charging-related parameters or other operating parameters received from one or more battery cells in internal battery 171.

In some embodiments, parameters monitored by a BMU 170 may include a charging current, a voltage, a battery impedance, and a temperature associated with internal battery 171. More specifically, the parameters monitored by the BMU 170 may include any or all of the cell configuration and chemistry of battery cells within internal battery 171, the total voltage of internal battery 171, the voltages of individual battery cells in internal battery 171, minimum or maximum cell voltages, the average temperature of internal battery 171 as a whole, the temperatures of individual battery cells in internal battery 171, a battery temperature distribution value as described herein, the SOC of internal battery 171, the depth of discharge of internal battery 171, the current flowing into internal battery 171, the current flowing out of internal battery 171, and any other measurement of the overall condition of internal battery 171, in various embodiments. In some embodiments, monitoring the SOC may include continuous or periodic monitoring of output current, voltage, or both for internal battery 171. In some cases, Coulomb counting, in which the charge delivered or stored by a battery is tracked, is used for monitoring of internal battery 171. In some embodiments, a battery temperature may be monitored through the use of periodic voltage measurements, a thermometer, or another type of sensor or method to detect or correct for variations in temperature. In some embodiments, at least some of the parameters monitored by BMU 170 may be used internally by BMU 170 for internal battery management operations. In some embodiments, at least some of the parameters monitored by BMU 170 may be provided to a power management function of embedded controller 180 to implement management of DC power sources, as well as for internal battery management. In some embodiments, a power management function of embedded controller 180 may be, or include, a battery management microcontroller for portable electronics that is designed to accept multiple inputs including, for example, temperature inputs and/or digital data inputs. In some embodiments, the management methods described herein may take advantage of such hardware, if available in the information handling system. In other embodiments, BMU 170 may be configured to implement internal battery management.

In certain embodiments, BMU 170 may include a processor and memory (not shown). The memory may store instructions executable by the processor to perform one or more methods for obtaining and calculating values related to the operation and charging of a battery and for controlling the operation and charging of the battery. The memory may also store data, obtained and calculated values, and/or any other parameters related to the methods described herein.

FIG. 2 is a block diagram illustrating selected elements of an embodiment of a system 200 including a portable device 210 and a wireless power module 240 each of which conforms to a wireless power transfer standard, such as the Qi interface standard. It is noted that FIG. 1 is not drawn to scale but is a schematic illustration. In some embodiments, wireless power module 240 may be or include a wireless charging mat, such as the host wireless charging mats or auxiliary wireless charging mats described herein. Wireless power module 240 may be operable to receive DC input power 265 and transmit inductive power 245 to portable device 210 for operation and/or charging.

As illustrated in FIG. 2, wireless power module 240 may include a power conversion unit 260, a mat embedded power controller 250, and a coil 280. In some embodiments, mat embedded power controller 250 may be coupled to power conversion unit 260 and may implement communication and control functionality for wireless power module 240. In some embodiments, coil 280 may include multiple coils. As shown, power conversion unit 260 may be coupled to coil 280. In at least some embodiments, coil 280 may provide and/or transmit one or more magnetic fields. For example, one or more magnetic fields may be powered via power conversion unit 260. In one or more embodiments, power conversion unit 260 and coil 280 may form and/or implement a wireless power transmitter that may transmit power via one or more magnetic fields. For example, coil 280 may be a primary or transmitting coil that generates an oscillating magnetic field.

As illustrated, mat embedded power controller 250 is communicatively coupled to power conversion unit 260 to exchange data and/or provide control signals (shown collectively as data and control 255) to power conversion unit 260. One example embodiment of mat embedded power controller 250 is illustrated in FIG. 4 and described below.

As illustrated in FIG. 2, portable device 210 may include a pickup power unit 225, coil 275, and device embedded power controller 230. In some embodiments, device embedded power controller 230 may include elements similar to those of EC 180 of system 100 shown in FIG. 1 and described above. For example, device embedded power controller 230 may implement communication and power management functionality for portable device 210. Device embedded power controller 230 is communicatively coupled to power pickup unit 225 to exchange data and/or provide control signals (shown collectively as data and control 235) to power pickup unit 225.

In one or more embodiments, pickup power unit 225 and coil 275 may form and/or implement a wireless power receiver that receives power via one or more magnetic fields. For example, coil 275 may be a secondary or receiving coil. The magnetic field transmitted by coil 280 may induce an alternating current in coil 275 by Faraday's law of induction. Close spacing of the two coils, as well as shielding on their surfaces, may ensure the inductive power transfer is efficient. For example, these coils may typically be on the order of 5 mm apart. However, the coils may be up to 40 mm apart, and possibly farther apart, in some embodiments.

As shown, coil 275 may be coupled to power pickup unit 225, and power pickup unit 225 may provide power 215 to other components 220 of portable device 210 for operation or for charging an internal battery, such as internal battery 171 illustrated in FIG. 1. In some embodiments, coil 275 may capture and/or receive one or more magnetic fields and may provide voltage and current from the one or more magnetic fields to power pickup unit 225. In some embodiments, power pickup unit 225 may provide regulated voltage and/or current to other device components 220 as power 215. In some embodiments, regulation of the output voltage may be provided by a digital control loop in which the receiver of the inductive power (in this case, portable device 210) communicates with the transmitter of the inductive power (in this case, wireless power module 240) and requests more or less power. Communication may be unidirectional from the power receiver to the power transmitter using, for example, backscatter modulation.

With the advent of the medium power Qi standard, there may be different use cases for charging both smart phones (or other small portable devices) and larger devices (such as laptop computers) using Qi compatible wireless charging mats. Some existing solutions involving off-the-shelf add-on charging modules include multiple cabled connections, making for a messy and/or complicated work space and a poor user experience. In at least some embodiments, the wireless charging mats described herein may support a cleaner solution for adding auxiliary (or secondary) wireless charging mats to a system that includes a host (or primary) wireless charging device. The host wireless charging device may implement a managed power structure that adaptively adds and/or subtracts inductive power available for charging devices place on the host wireless charging mat from the total available power to offset the amount of power provided to one or more auxiliary wireless charging mats or other devices connected to the host wireless charging mat. For example, rather than reserving 15 watts for each of two ports on the host wireless charging mat, an embedded controller may adaptively allocate power to auxiliary wireless charging mats or other devices (in an amount that is less than or equal to 15 watts) as needed, and may budget all or most of the remaining power to be provided as inductive power transmitted to portable devices placed on the host wireless charging mat. In some embodiments, the systems described herein may support power conversion from an input power of 12-15 watts to an output power of 10 watts at 5V, for example. Extensions of power using 4P negotiation may allow for higher input power and for delivering full 15 watt 5V power to auxiliary wireless charging mats or other devices, in some embodiments.

Figure 3:
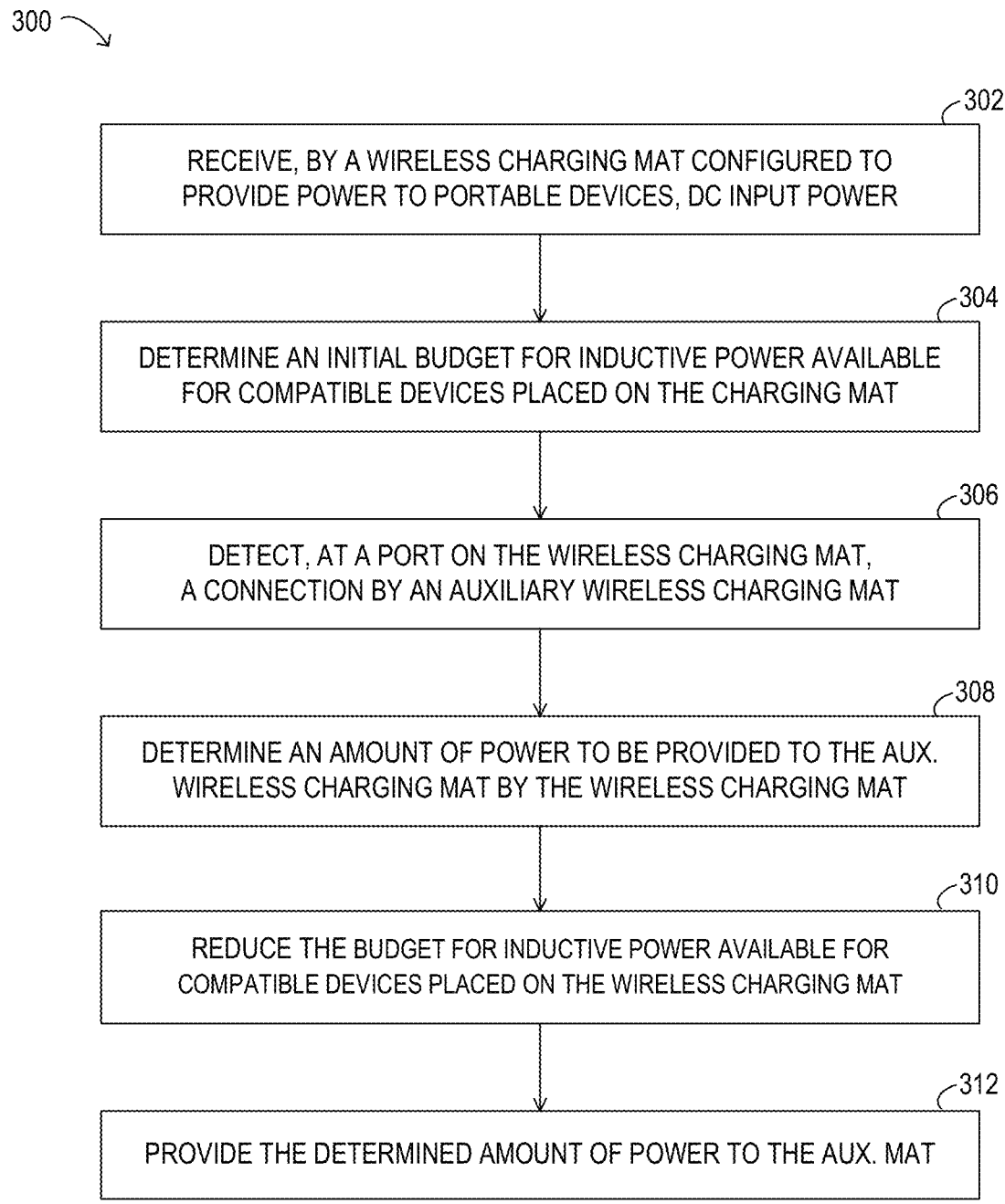
FIG. 3 is flow diagram illustrating selected elements of a method for adaptive power management for auxiliary wireless power modules, according to some embodiments.

Referring now to FIG. 3, selected elements of an embodiment of method 300 for adaptive power management for auxiliary wireless power modules, as described herein, is depicted in flowchart form. In certain embodiments, method 300 may be performed using an embedded controller within a wireless power module, such as mat embedded power controller 250 illustrated FIG. 2. Method 300 may be performed repeatedly or continuously to adaptively manage the allocation of power by a host wireless power module as different types of devices are connected to and disconnected from the host wireless power module. It is noted that certain operations described in method 300 may be optional or may be rearranged in different embodiments.

Method 300 may begin, at 302, with receiving, by a wireless charging mat configured to provide power to portable devices, DC input power. The wireless charging mat may be configured to provide inductive power to at least some devices placed on the wireless charging mat. For example, the wireless charging mat may be configured to transfer indicative power to portable devices that implement the Qi wireless power transfer standard (referred to herein as "Qi compatible devices" or, simply "compatible devices"). In some embodiments, the wireless charging mat may be configured to authenticate devices as to their origin (e.g., the manufacturer), in which case the wireless charging mat may be able to determine charging characteristics or other relevant information about the devices, and/or as being Qi compatible. For example, if the wireless charging device determines that a device does not have proper credentials, the wireless charging device may refrain from providing inductive power to the device. In some embodiments, the wireless charging mat may also be configured to provide power to devices that are not compatible with the Qi wireless power transfer standard. For example, the wireless charging mat may provide power to USB devices that do not implement the Qi wireless power transfer standard over a cabled connection between the USB device and the wireless charging mat.

At 304, method 300 may include determining an initial budget for the inductive power available to be provided to Qi compatible devices placed on the charging mat. In one example, the initial budget may be 65 watts, which may be sufficient for charging large devices, such as laptop computers.

At 306, the method may include detecting, at a port on the wireless charging mat, a connection by an auxiliary wireless charging mat. For example, an auxiliary wireless charging mat may be connected directly (e.g., without cabling) to the wireless charging mat at one of two or more ports of the wireless charging mat. In some embodiments, the wireless charging mat may be configured to authenticate auxiliary wireless charging mats connected to the wireless charging mat as to their origin (e.g., the manufacturer) and/or as being Qi compatible. For example, if the wireless charging device determines that an auxiliary wireless charging mat connected to one of its ports does not have proper credentials, the wireless charging device may refrain from providing power to the auxiliary wireless charging mat.

At 308, method 300 may include determining an amount of power to be provided to the auxiliary wireless charging mat by the wireless charging mat. For example, in some embodiments, up to a maximum or default amount of 15 watts may be provided to the auxiliary wireless charging mat. In some embodiments, the amount of power provided to the auxiliary wireless charging mat may be subsequently reduced once, for example, the state-of-charge of a battery in a portable device placed on the auxiliary wireless charging mat reaches a state at which the battery is considered fully charged or if power consumption by the auxiliary wireless charging mat drops while it is connected to the wireless charging mat.

At 310, the method may include reducing the budget for the inductive power available to be provided to Qi compatible devices placed on the charging mat. In some embodiments, this may involve calculating the amount of converted inductive power available for Qi compatible devices as the total pool of power converted by a power conversion unit (such as power conversion unit 260 illustrated in FIG. 2) minus any power allocated to non-Qi-compatible devices.

At 312, the method may include providing the determined amount of power to the auxiliary mat. In some embodiments, the method may also include providing inductive power allocated from the reduced budget for the inductive power to one or more Qi compatible devices placed on the charging mat, if any (not shown in FIG. 3).

FIG. 4 is a block diagram illustrating selected elements of an embodiment of a power management circuit for managing power in a wireless power module 400 of an information handling system, such as portable information handling system 100 illustrated in FIG. 1. In some embodiments, wireless power module 400 may include elements similar to those of wireless power module 240 illustrated in FIG. 2. In various embodiments, wireless power module 400 may be or include a wireless charging mat, such as the host wireless charging mats or auxiliary wireless charging mats described herein. It is noted that FIG. 4 is not drawn to scale but is a schematic illustration. In the illustrated embodiment, system 400 includes multiple ports, including port 1 (404-1) and port N (404-n), each of which is coupled to a respective system component, shown as a device or auxiliary wireless charging mat 402. In some embodiments, at least some of the ports 404 may be configured as USB type ports or more specifically, USB-C type ports. System 400 also includes a mat embedded power controller 450, which may be similar to mat embedded power controller 250 illustrated in FIG. 2.

In the illustrated embodiment, a DC input power source 408 (for example, a 20V power source) is coupled to multiple buck-boost DC conversion circuits 406 each of which may (optionally) be used to measure and/or limit the current provided to a respective device or auxiliary wireless charging mat 402 connected to wireless power module 400 at a respective port 404 or to step the DC voltage of the electrical power supplied to a given device or auxiliary wireless charging mat 402 connected to wireless power module 400 at a respective port 404 by power source 408 up or down. In some embodiments, each buck-boost DC conversion circuit 406 may be externally controlled to provide a desired DC voltage output, such as in response to a control signal from mat embedded power controller 450 or in response to another trigger condition.

In the illustrated embodiment, mat embedded power controller 450 may be configured for implementing adaptive power management for one or more auxiliary wireless power modules, such as one or more auxiliary wireless charging mats 402 connected to a host wireless charging mat. As illustrated in FIG. 4, in some embodiments, mat embedded power controller 450 may include EC processor 458 as a second processor included within wireless power module 400 for certain power management tasks, including adaptive power management for one or more auxiliary wireless power modules, such as one or more auxiliary wireless charging mats 402. Thus, EC processor 458 may have access to EC memory 452, which may store EC firmware 454, representing instructions executable by EC processor 458. As shown, EC firmware 454 includes power management 456. In embodiments in which wireless power module 400 is a host wireless charging mat, power management 456 may represent executable code for adaptive power management for one or more auxiliary wireless power modules, as disclosed herein. For example, at least certain portions of the methods for adaptive power management for one or more auxiliary wireless power modules described herein may be implemented using EC firmware 454, such as specialized executable instructions for power management and control. In embodiments in which wireless power module 400 is an auxiliary wireless charging mat, power management 456 may represent executable code for managing power and/or charging operations within the auxiliary wireless charging mat, which might or might not include executable code for adaptive power management, as described herein. In at least some embodiments, EC firmware 454 may be in control of one or more EC communication interfaces 460, which may represent one or more input/output interfaces or signals that mat embedded power controller 450 can use to communicate with other elements of wireless power module 400, such as a power conversion unit (e.g., power conversion unit 260 illustrated in FIG. 2), among others.

As shown in FIG. 4, the inputs to mat embedded power controller 450 may include, but are not limited to, the temperature of the system (shown as skin temperature 422), at least one state-of-charge input 424 for a portable device being charged by the wireless power module 400, one or more inputs representing state-of-charge inputs or power consumption levels 426 for portable devices being charged by respective auxiliary wireless charging mats 402, and an input 432 representing the best energy state needed (based, for example, on a requested amount of electrical power, a calculated amount of electrical power, a negotiated amount of electrical power, and/or an amount of electrical power required to charge an internal battery of a portable device being charged by wireless power module 400).

Other inputs to mat embedded power controller 450 may include may include, for each of one or more DC power sources, such as DC power source adapters that provide DC input power (shown as DC_in 408), inputs representing an adapter type 428 and an adapter status 430 for the respective DC power source adapters through which each power source supplies power to the system.

Additional inputs to mat embedded power controller 450 may include, for example, data indicating the voltage at which power is supplied to various components within wireless power module 400 and/or the state of any combined DC input power supplied by multiple power sources, shown as V_mat, V_core 410 (e.g., 20V). Based on an analysis of at least these inputs, mat embedded power controller 450 may implement adaptive power management for one or more auxiliary wireless power modules, such as one or more auxiliary wireless charging mats 402.

In the embodiment illustrated in FIG. 4, only two port connections are shown. However, mat embedded power controller 450 may include circuitry to support any number of devices and/or auxiliary wireless charging mats 402 connected to wireless power module 400 at respective port connections 404, in other embodiments. In embodiments in which wireless power module 400 is an auxiliary wireless charging mat, wireless power module 400 may include a flexible USB-C type plug connector (not shown in FIG. 4) for electrically and physically connecting the auxiliary wireless charging mat to a host wireless charging mat. In some embodiments, DC input power 408 may be driven by an AC/DC convertor. However, in other embodiments, the source of DC input power 408 may be an other type of external power source including, but not limited to, an external battery and/or a solar power solution, any of which may be coupled to mat embedded power controller 450 using any suitable type of wired or wireless interface protocol and/or physical connection.

Figure 5:
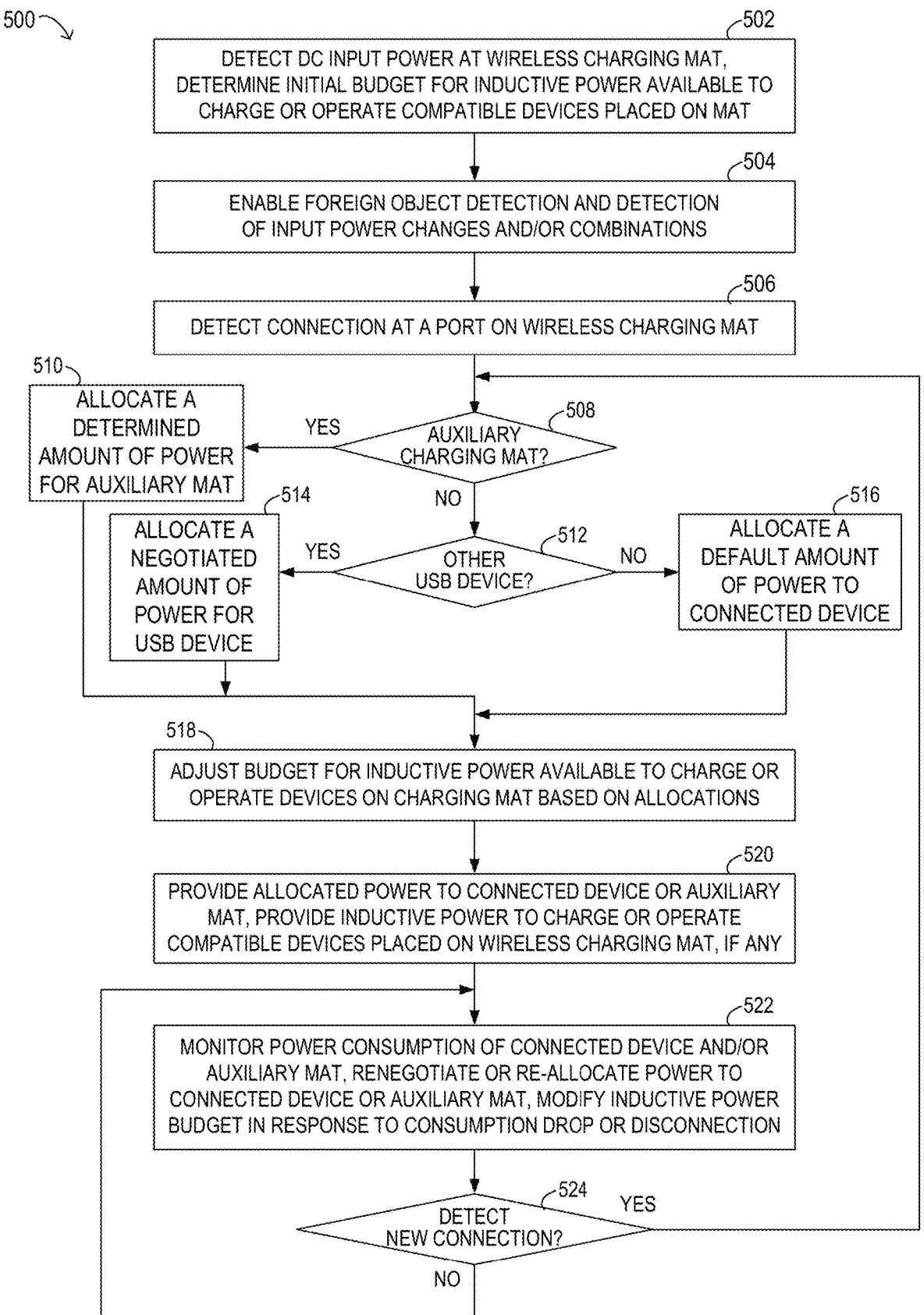
FIG. 5 is a flow diagram illustrating selected elements of a method for adaptive power management by a wireless power module, according to some embodiments.

FIG. 5 is a flow diagram illustrating selected elements of a method 500 for adaptive power management by a wireless power module, according to some embodiments. Method 500 may be performed using mat embedded power controller 250 (see FIG. 2) or mat embedded power controller 450 (see FIG. 4) and, in particular, by power management 456 within mat embedded power controller 450, in some embodiments. Method 500 may be performed repeatedly or continuously to implement adaptive power management in response to various power events or system events. It is noted that certain operations described in method 500 may be optional or may be rearranged in different embodiments.

Method 500 may include, at 502, detecting DC input power at a wireless charging mat and determining an initial budget for the inductive power available to charge or operate Qi compatible devices placed on mat. For example, the wireless charging mat may receive DC input power from any of a variety of DC power sources including, but not limited to, a DC power adapter connected to the wireless charging mat through a barrel connector. In another example, the DC input power for the wireless charging mat may be supplied through a USB-C type connector by a peripheral device, such as a monitor device that is itself powered by a DC power adapter and that has a sufficiently large USB-C output to drive the wireless charging mat. In some embodiments, the DC input power supplied to the wireless charging mat may be on the order of 65 watts or 90 watts. In some embodiments, the total available power may be allocated to different components in different amounts. For example, 5 watts, 10 watts, or 15 watts may be allocated to smaller portable devices or to an auxiliary wireless charging mat, while up to 65 watts may be allocated for a larger device (such as a laptop computer).

At 504, the method may include enabling foreign object detection. For example, foreign object detection may be used to determine whether an incompatible device that can capture power intended for compatible devices is placed on, or in proximity to, the wireless charging mat. If such an object is detected, an alert may be generated or the mat embedded power controlled may take measures to protect the wireless charging mat and/or other components. The method may also include enabling the detection of changes to the DC input power source (or its connection state) and/or the detection of combinations of multiple DC input power sources through respective connections.

At 506, method 500 may include detecting a connection at a port on the wireless charging mat. For example, the method may include detecting the connection of a device to be charged by the wireless charging mat or the connection of an auxiliary wireless charging mat operable for charging devices using power allocated from the wireless charging mat to the auxiliary wireless charging mat.

If, at 508, it is determined that an auxiliary wireless charging mat is connected at the port, method 500 may proceed to 510. Otherwise, method 500 may proceed to 512. At 510, the method may include allocating a determined amount of power for the auxiliary mat. In some embodiments, a default amount for auxiliary wireless charging mats (e.g., 15 watts) may be provided. In other embodiments, the auxiliary wireless charging mat may communicate and/or negotiate for a requested amount of power.

If, at 512, it is determined that another type of USB device is connected at the port, method 500 may proceed to 514. Otherwise, method 500 may proceed to 516. At 514, the method may include allocating a negotiated amount of power for the USB device. For example, the USB device may request a particular amount of power to operate or charge an internal battery of the USB device while connected to the wireless charging mat.

At 516, method 500 may include allocating a default amount of power to the connected device. In some embodiments the default amount of power may be a default amount allocated for devices that are not compatible with the Qi wireless power transfer standard and/or that do not support communication or negotiation of a requested amount of power. In some embodiments, a default amount for unknown devices (e.g., 5 watts) may be provided.

At 518, the method may include adjusting the budget for the inductive power available to charge or operate devices placed on the charging mat based on any allocations made to a connected device or auxiliary wireless charging mat.

At 520, method 500 may include providing the allocated power to the connected device or auxiliary mat and providing inductive power to charge or operate Qi compatible devices placed on the wireless charging mat, if any. In some embodiments, a Qi compatible device may request more or less power through a digital control loop, as described above in reference to FIG. 2.

At 522, the method may include monitoring the power consumption of any connected devices and/or auxiliary mats, as well as renegotiating and/or re-allocating power to the connected devices or auxiliary mats and/or modifying the inductive power budget in response to a drop in power consumption or the disconnection of a connected devices or auxiliary mat.

If and when, at 524, a new connection is detected at a port on the wireless charging mat, method 500 may return to 508 and repeat the operations shown as 508-522, as appropriate, in light of the new connection.

Figure 6A:
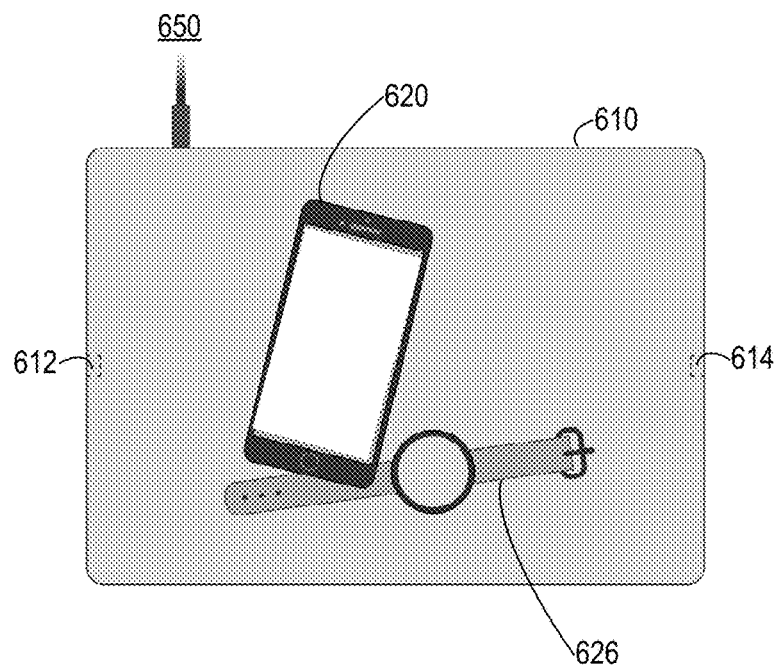
FIGS. 6A-6E illustrate respective configurations of systems including a wireless power module, according to some embodiments.

FIGS. 6A-6E illustrate respective configurations of systems including a wireless power module, according to some embodiments. More specifically, FIG. 6A illustrates a system 600 that includes a wireless power module shown as a wireless charging mat 610. In various embodiments, wireless charging mat 610 may be similar to wireless power module 240 illustrated in FIG. 2 or wireless power module 400 illustrated in FIG. 4. Wireless charging mat 610 includes ports 612 and 614, each located on a respective side of wireless charging mat 610. In at least some embodiments, one or both of ports 612 and 614 may be configured as USB type ports or, more specifically, as USB-C type ports. Wireless charging mat 610 receives DC input power 650 through a third port (not explicitly shown in FIG. 6A). In the illustrated configuration, there is nothing connected to wireless charging mat 610 through either of the ports 612 or 614. Two portable devices that are compatible with a wireless power transfer standard implemented by wireless charging mat 610 (such as the Qi wireless power transfer standard), shown as smart phone 620 and smart watch 626, have been placed on wireless charging mat 610 for charging. In this configuration, the entire inductive power budget may be available for charging Qi certified smart phone 620 and Qi certified smart watch 626.

Figure 6B:
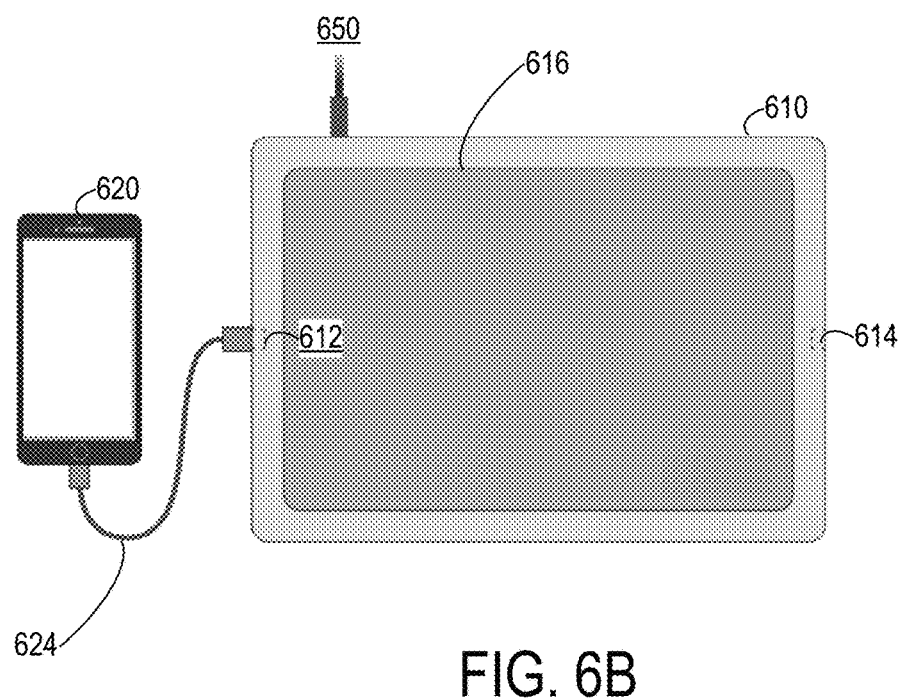

FIG. 6B illustrates a system 602 that includes wireless charging mat 610. In various embodiments, wireless charging mat 610 may be similar to wireless power module 240 illustrated in FIG. 2 or wireless power module 400 illustrated in FIG. 4. As in the previous example configuration, wireless charging mat 610 includes ports 612 and 614, each located on a respective side of wireless charging mat 610, and wireless charging mat 610 receives DC input power 650 through a third port (not explicitly shown in FIG. 6B). In at least some embodiments, one or both of ports 612 and 614 may be configured as USB type ports or, more specifically, as USB-C type ports. In the illustrated configuration, there is nothing connected to wireless charging mat 610 through port 614. A first portable device that is compatible with a wireless power transfer standard implemented by wireless charging mat 610, shown as Qi enabled laptop computing device 616, has been placed on wireless charging mat 610 for charging. A second portable device, which might or might not be compatible with a wireless power transfer standard implemented by wireless charging mat 610, shown as smart phone 620, is connected to wireless charging mat 610 at port 612 using a cable 624. In this example, after allocating a determined amount of power to smart phone 620, the available inductive power budget may be reduced and the entire reduced budget may be available as inductive power for charging laptop computing device 616.

Figure 6C:
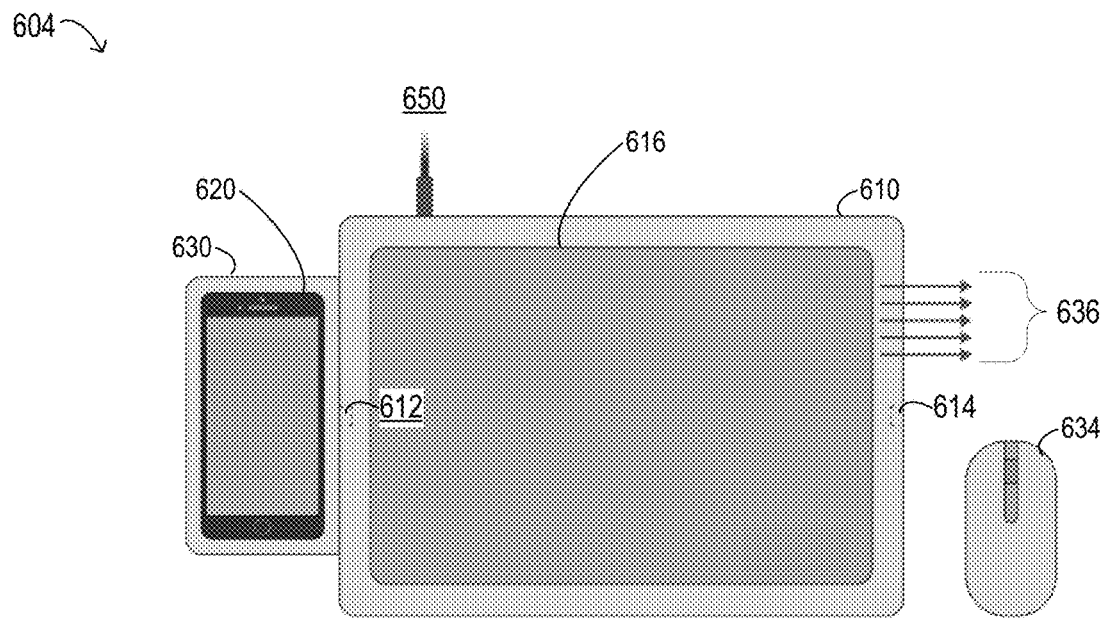
Figure 6D:
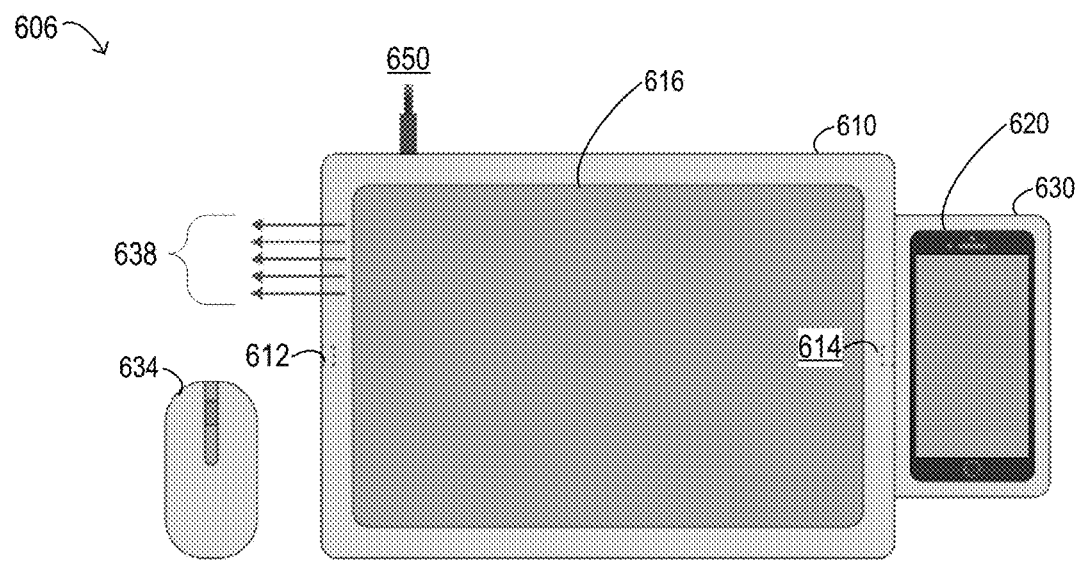

FIGS. 6C and 6D illustrate configurations that have been optimize for user experience (e.g., right- and left-handedness) and thermal considerations. For example, FIG. 6C illustrates a system 604 that includes wireless charging mat 610. In various embodiments, wireless charging mat 610 may be similar to wireless power module 240 illustrated in FIG. 2 or wireless power module 400 illustrated in FIG. 4. As in the previous example configurations, wireless charging mat 610 includes ports 612 and 614, each located on a respective side of wireless charging mat 610, and wireless charging mat 610 receives DC input power 650 through a third port (not explicitly shown in FIG. 6C). In at least some embodiments, one or both of ports 612 and 614 may be configured as USB type ports or, more specifically, as USB-C type ports. In the illustrated configuration, system 604 is configured for right-handed operation, as there is nothing connected to wireless charging mat 610 through port 614. A first portable device that is compatible with a wireless power transfer standard implemented by wireless charging mat 610, shown as Qi enabled laptop computing device 616, has been placed on wireless charging mat 610 for charging. An auxiliary Qi enabled wireless charging mat 630 is connected directly (e.g., without cabling) to wireless charging mat 610 at port 612. In some embodiments, auxiliary wireless charging mat 630 may include a flexible USB-C type plug connector for electrically and physically connecting auxiliary wireless charging mat 630 to wireless charging mat 610. The use of a flexible USB-C type plug connector may allow for some variation in the height of auxiliary wireless charging mat 630 compared to wireless charging mat 610. In various embodiments, auxiliary wireless charging mat 630 may be similar to wireless power module 240 illustrated in FIG. 2 or wireless power module 400 illustrated in FIG. 4. A second portable device, which might or might not be compatible with a wireless power transfer standard implemented by wireless charging mat 610, shown as smart phone 620, has been placed on auxiliary wireless charging mat 630 for charging. In this example, after allocating a determined amount of power to auxiliary wireless charging mat 630, the available inductive power budget may be reduced and the entire reduced budget may be available as inductive power for charging laptop computing device 616. In the illustrated configuration, a wireless mouse 634 that is not compatible with a wireless power transfer standard implemented by wireless charging mat 610 is positioned on the side of wireless charging mat 610 opposite port 612 for right-handed use and is communicatively coupled to laptop computing device 616. In this position, wireless mouse 634 is not charged by wireless charging mat 610. In the illustrated embodiment, hot air, shown as 636, may be vented from wireless charging mat 610 on the side of wireless charging mat 610 opposite port 612 where the vented air will not be blocked by a connected auxiliary wireless charging mat.

FIG. 6D illustrates a system 606 that includes wireless charging mat 610. In various embodiments, wireless charging mat 610 may be similar to wireless power module 240 illustrated in FIG. 2 or wireless power module 400 illustrated in FIG. 4. As in the previous example configurations, wireless charging mat 610 includes ports 612 and 614, each located on a respective side of wireless charging mat 610, and wireless charging mat 610 receives DC input power 650 through a third port (not explicitly shown in FIG. 6D). In at least some embodiments, one or both of ports 612 and 614 may be configured as USB type ports or, more specifically, as USB-C type ports. In the illustrated configuration, system 606 is configured for left-handed operation, as there is nothing connected to wireless charging mat 610 through port 612. A first portable device that is compatible with a wireless power transfer standard implemented by wireless charging mat 610, shown as Qi enabled laptop computing device 616, has been placed on wireless charging mat 610 for charging. An auxiliary Qi enabled wireless charging mat 630 is connected directly (e.g., without cabling) to wireless charging mat 610 at port 614. In some embodiments, auxiliary wireless charging mat 630 may include a flexible USB-C type plug connector for electrically and physically connecting auxiliary wireless charging mat 630 to wireless charging mat 610. The use of a flexible USB-C type plug connector may allow for some variation in the height of auxiliary wireless charging mat 630 compared to wireless charging mat 610. In various embodiments, auxiliary wireless charging mat 630 may be similar to wireless power module 240 illustrated in FIG. 2 or wireless power module 400 illustrated in FIG. 4. In this example configuration, auxiliary wireless charging mat 630 may be identical to auxiliary wireless charging mat 630 illustrated in FIG. 6C, but may be rotated 180 degrees into a position in which it can be connected to port 614 rather than port 612. A second portable device, which might or might not be compatible with a wireless power transfer standard implemented by wireless charging mat 610, shown as smart phone 620, has been placed on auxiliary wireless charging mat 630 for charging. As in the previous example, after allocating a determined amount of power to auxiliary wireless charging mat 630, the available inductive power budget may be reduced and the entire reduced budget may be available as inductive power for charging laptop computing device 616. In the illustrated configuration, a wireless mouse 634 that is not compatible with a wireless power transfer standard implemented by wireless charging mat 610 is positioned on the side of wireless charging mat 610 opposite port 614 for left-handed use and is communicatively coupled to laptop computing device 616. In this position, wireless mouse 634 is not charged by wireless charging mat 610. In the illustrated embodiment, hot air, shown as 638, may be vented from wireless charging mat 610 on the side of wireless charging mat 610 opposite port 614 where the vented air will not be blocked by a connected auxiliary wireless charging mat.

Figure 6E:
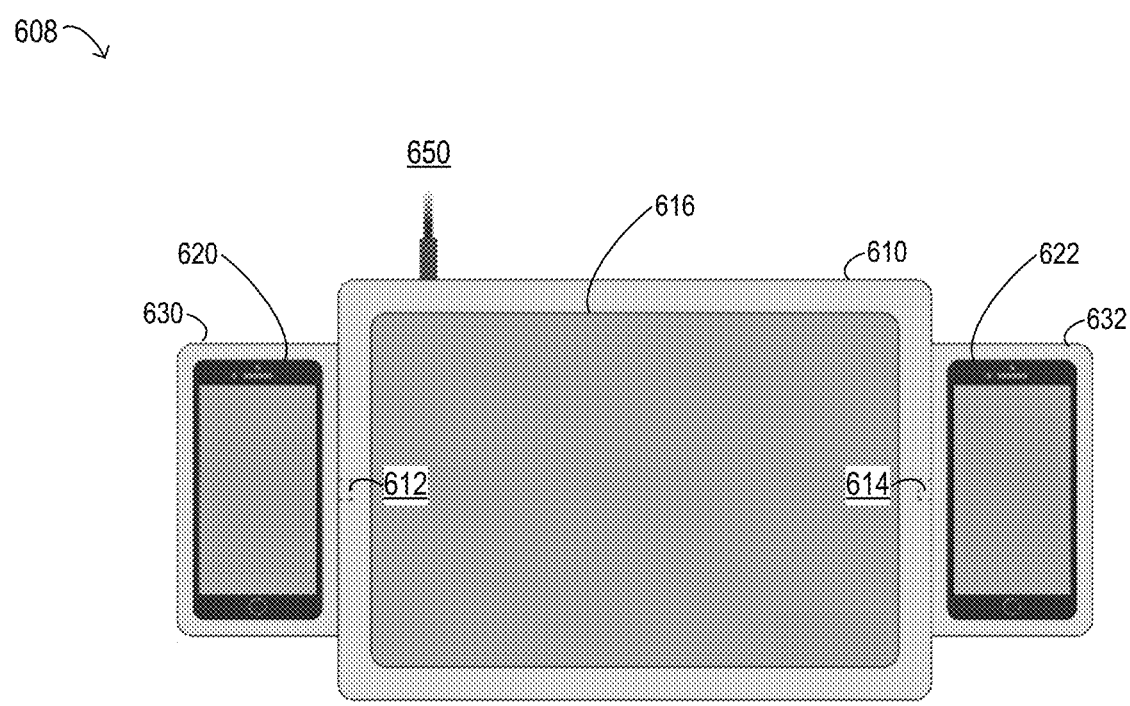

FIG. 6E illustrates a system 608 that includes wireless charging mat 610 and that is configured for maximum output power expansion. In various embodiments, wireless charging mat 610 may be similar to wireless power module 240 illustrated in FIG. 2 or wireless power module 400 illustrated in FIG. 4. As in the previous example configurations, wireless charging mat 610 includes ports 612 and 614, each located on a respective side of wireless charging mat 610, and wireless charging mat 610 receives DC input power 650 through a third port (not explicitly shown in FIG. 6E). In the illustrated configuration, a first portable device that is compatible with a wireless power transfer standard implemented by wireless charging mat 610, shown as Qi enabled laptop computing device 616, has been placed on wireless charging mat 610 for charging. An auxiliary Qi enabled wireless charging mat 630 is connected directly (e.g., without cabling) to wireless charging mat 610 at port 612. In some embodiments, auxiliary wireless charging mat 630 may include a flexible USB-C type plug connector for electrically and physically connecting auxiliary wireless charging mat 630 to wireless charging mat 610. The use of a flexible USB-C type plug connector may allow for some variation in the height of auxiliary wireless charging mat 630 compared to wireless charging mat 610. In various embodiments, auxiliary wireless charging mat 630 may be similar to wireless power module 240 illustrated in FIG. 2 or wireless power module 400 illustrated in FIG. 4. A second portable device, which might or might not be compatible with a wireless power transfer standard implemented by wireless charging mat 610, shown as smart phone 620, has been placed on auxiliary wireless charging mat 630 for charging. In addition, an auxiliary Qi enabled wireless charging mat 632 is connected directly (e.g., without cabling) to wireless charging mat 610 at port 614. In some embodiments, auxiliary wireless charging mat 632 may include a flexible USB-C type plug connector for electrically and physically connecting auxiliary wireless charging mat 632 to wireless charging mat 610. The use of a flexible USB-C type plug connector may allow for some variation in the height of auxiliary wireless charging mat 632 compared to wireless charging mat 610. In various embodiments, auxiliary wireless charging mat 632 may be similar to wireless power module 240 illustrated in FIG. 2 or wireless power module 400 illustrated in FIG. 4. In at least some embodiments, auxiliary wireless charging mat 632 and auxiliary wireless charging mat 632 may be identical (or substantially similar) but may be rotated into different positions for connecting to port 612 on the left side of wireless charging mat 610 or to port 614 on the right side of wireless charging mat 610. A third portable device, which might or might not be compatible with a wireless power transfer standard implemented by wireless charging mat 610, shown as smart phone 622, has been placed on auxiliary wireless charging mat 632 for charging. In this example, after allocating a determined amount of power to auxiliary wireless charging mat 630 and a determined amount of power to auxiliary wireless charging mat 632, the available inductive power budget may be reduced and the entire reduced budget may be available as inductive power for charging laptop computing device 616.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A host wireless charging mat for an information handling system, comprising:
  a first port;
  a direct current (DC) power interface configured to receive DC input power;
  a transmitting coil configured to generate an oscillating magnetic field;
  a power conversion unit electrically coupled to the DC power interface that, in conjunction with the transmitting coil, is configured to transmit inductive power; and
  an embedded power controller configured to:
    determine, dependent on the received DC input power, an initial budget for inductive power available for portable devices placed on the host wireless charging mat;
    detect, at the first port, a connection by a first auxiliary wireless charging mat;
    determine an amount of power to be provided to the first auxiliary wireless charging mat;

determine, dependent on the amount of power to be provided to the first auxiliary wireless charging mat, a reduced budget for the inductive power available for portable devices placed on the host wireless charging mat; and cause the determined amount of power to be supplied to the first auxiliary wireless charging mat.

2. The host wireless charging mat of claim 1, wherein the embedded power controller is further configured to:

detect, at a second port on the host wireless charging mat, a connection by a second auxiliary wireless charging mat;

determine an amount of power to be provided to the second auxiliary wireless charging mat by the host wireless charging mat;

determine, dependent on the amount of power to be provided to the second auxiliary wireless charging mat by the host wireless charging mat, a further reduced budget for the inductive power available for portable devices placed on the host wireless charging mat; and cause the determined amount of power to be supplied to the second auxiliary wireless charging mat.

3. The host wireless charging mat of claim 1, wherein the embedded power controller is further configured to:

detect, at a second port on the host wireless charging mat, a connection by a portable device;

determine an amount of power to be provided to the portable device by the host wireless charging mat;

determine, dependent on the amount of power to be provided to the portable device by the host wireless charging mat, a further reduced budget for the inductive power available for portable devices placed on the host wireless charging mat; and cause the determined amount of power to be supplied to the portable device.

4. The host wireless charging mat of claim 3, wherein:

the embedded power controller is further configured to determine that the portable device is compatible with a wireless power transfer standard implemented by the host wireless charging mat; and determining the amount of power to be provided to the portable device comprises receiving, from the portable device, an indication of a requested amount of power.

5. The host wireless charging mat of claim 1, wherein:

the embedded power controller is further configured to determine that the first auxiliary wireless charging mat is compatible with a wireless power transfer standard implemented by the host wireless charging mat; and determining the amount of power to be provided to the first auxiliary wireless charging mat comprises receiving, from the first auxiliary wireless charging mat, an indication of a requested amount of power.

6. The host wireless charging mat of claim 1, wherein the embedded power controller is further configured to:

detect that the first auxiliary wireless charging mat is no longer connected to the first port on the host wireless charging mat; and determine, dependent on detecting that the first auxiliary wireless charging mat is no longer connected to the first port on the host wireless charging mat, an increased budget for the inductive power available for portable devices placed on the host wireless charging mat.

7. The host wireless charging mat of claim 1, wherein the embedded power controller is further configured to:

detect that a portable device has been placed on the host wireless charging mat; and cause an amount of inductive power less than or equal to the initial budget for the inductive power available for portable devices placed on the host wireless charging mat to be supplied to the portable device.

8. The host wireless charging mat of claim 1, wherein the embedded power controller is further configured to:

monitor power consumption by the first auxiliary wireless charging mat; and determine, in response to detecting a change in power consumption by the first auxiliary wireless charging mat, a modified budget for the inductive power available for portable devices placed on the host wireless charging mat.

9. The host wireless charging mat of claim 1, further comprising:

a second port located at a side of the host wireless charging mat other than a side at which the first port is located, the first and second ports being configured for non-cabled connections to the host wireless charging mat; and a respective vent mechanism located on the side of the host wireless charging mat at which the first port is located and on the side of the host wireless charging mat at which the second port is located.

10. A method for adaptive power management, comprising:

receiving, by a host wireless charging mat configured to provide power to portable devices, direct current (DC) input power;

determining, dependent on the received DC input power, an initial budget for inductive power available for portable devices placed on the host wireless charging mat;

detecting, at a first port on the host wireless charging mat, a connection by a first auxiliary wireless charging mat;

determining an amount of power to be provided to the first auxiliary wireless charging mat by the host wireless charging mat;

determining, dependent on the amount of power to be provided to the first auxiliary wireless charging mat by the host wireless charging mat, a reduced budget for the inductive power available for portable devices placed on the host wireless charging mat; and providing the determined amount of power to the first auxiliary wireless charging mat.

11. The method of claim 10, further comprising:

detecting, at a second port on the host wireless charging mat, a connection by a second auxiliary wireless charging mat;

determining an amount of power to be provided to the second auxiliary wireless charging mat by the host wireless charging mat;

determining, dependent on the amount of power to be provided to the second auxiliary wireless charging mat by the host wireless charging mat, a further reduced budget for the inductive power available for portable devices placed on the host wireless charging mat; and providing the determined amount of power to the second auxiliary wireless charging mat.

12. The method of claim 10, further comprising:

detecting, at a second port on the host wireless charging mat, a connection by a portable device;

determining an amount of power to be provided to the portable device by the host wireless charging mat;

determining, dependent on the amount of power to be provided to the portable device by the host wireless charging mat, a further reduced budget for the inductive power available for portable devices placed on the host wireless charging mat; and providing the determined amount of power to the portable device.

13. The method of claim 10, wherein:

the method further comprises determining that the first auxiliary wireless charging mat is compatible with a wireless power transfer standard implemented by the host wireless charging mat;

determining the amount of power to be provided to the first auxiliary wireless charging mat comprises receiving, from the first auxiliary wireless charging mat, an indication of a requested amount of power.

14. The method of claim 10, further comprising:

detecting that a portable device has been placed on the host wireless charging mat; and providing, to the portable device, an amount of inductive power less than or equal to the initial budget for the inductive power available for portable devices placed on the host wireless charging mat.

15. The method of claim 10, further comprising:

monitoring power consumption by the first auxiliary wireless charging mat; and determining, in response to detecting a change in power consumption by the first auxiliary wireless charging mat, a modified budget for the inductive power available for portable devices placed on the host wireless charging mat.

16. Non-transitory computer readable memory media storing instructions executable by a processor for:

determining, dependent on direct current (DC) input power received by a host wireless charging mat, an initial budget for inductive power available for portable devices placed on the host wireless charging mat;

detecting a connection by a first auxiliary wireless charging mat at a first port on the host wireless charging mat;

determining an amount of power to be provided to the first auxiliary wireless charging mat by the host wireless charging mat;

determining, dependent on the amount of power to be provided to the first auxiliary wireless charging mat, a reduced budget for the inductive power available for portable devices placed on the host wireless charging mat; and causing the determined amount of power to be supplied to the first auxiliary wireless charging mat.

17. The non-transitory computer readable memory media of claim 16, wherein the instructions are further executable by the processor for:

detecting, at a second port on the host wireless charging mat, a connection by a second auxiliary wireless charging mat;

determining an amount of power to be provided to the second auxiliary wireless charging mat by the host wireless charging mat;

determining, dependent on the amount of power to be provided to the second auxiliary wireless charging mat by the host wireless charging mat, a further reduced budget for the inductive power available for portable devices placed on the host wireless charging mat; and causing the determined amount of power to be supplied to the second auxiliary wireless charging mat.

18. The non-transitory computer readable memory media of claim 16, wherein the instructions are further executable by the processor for:

detecting, at a second port on the host wireless charging mat, a connection by a portable device;

determining an amount of power to be provided to the portable device by the host wireless charging mat;

determining, dependent on the amount of power to be provided to the portable device by the host wireless charging mat, a further reduced budget for the inductive power available for portable devices placed on the host wireless charging mat; and causing the determined amount of power to be supplied to the portable device.

19. The non-transitory computer readable memory media of claim 16, wherein:

the instructions are further executable by the processor for determining that the first auxiliary wireless charging mat is compatible with a wireless power transfer standard implemented by the host wireless charging mat; and determining the amount of power to be provided to the first auxiliary wireless charging mat comprises receiving, from the first auxiliary wireless charging mat, an indication of a requested amount of power.

20. The non-transitory computer readable memory media of claim 16, wherein the instructions are further executable by the processor for:

detecting that a portable device has been placed on the host wireless charging mat; and causing an amount of inductive power less than or equal to the initial budget for the inductive power available for portable devices placed on the host wireless charging mat to be supplied to the portable device.

* * * * *